(12) United States Patent
Park et al.

(10) Patent No.: US 10,444,571 B2
(45) Date of Patent: Oct. 15, 2019

(54) LIQUID CRYSTAL DISPLAY AND METHOD OF MANUFACTURING THE SAME

(71) Applicant: Samsung Display Co. Ltd., Yongin-si, Gyeonggi-do (KR)

(72) Inventors: Joon Hyung Park, Seoul (KR); Kang Seob Jeong, Seongnam-si (KR); Jong Ho Son, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 327 days.

(21) Appl. No.: 15/236,709

(22) Filed: Aug. 15, 2016

(65) Prior Publication Data

US 2017/0219888 A1 Aug. 3, 2017

(30) Foreign Application Priority Data

Feb. 1, 2016 (KR) ........................ 10-2016-0012120

(51) Int. Cl.
*G02F 1/1337* (2006.01)
*C09K 19/54* (2006.01)
*C09K 19/56* (2006.01)
*C09K 19/04* (2006.01)
*C09K 19/12* (2006.01)

(52) U.S. Cl.
CPC ........ *G02F 1/133711* (2013.01); *C09K 19/54* (2013.01); *C09K 19/56* (2013.01); *G02F 1/13378* (2013.01); *G02F 1/133788* (2013.01); C09K 2019/0448 (2013.01); C09K 2019/122 (2013.01); G02F 2001/133726 (2013.01); Y10T 428/1005 (2015.01)

(58) Field of Classification Search
CPC .. C09K 19/54; C09K 19/56; C09K 2019/122; C09K 2019/0448; G02F 1/133711; G02F 1/13378; G02F 1/133788; G02F 1/133726; G02F 2001/133726; Y10T 428/1005
See application file for complete search history.

(56) References Cited

U.S. PATENT DOCUMENTS

| 7,731,865 | B2 | 6/2010 | Bernatz et al. |
| 8,114,310 | B2 | 2/2012 | Bernatz et al. |
| 8,968,842 | B2 | 3/2015 | Bae et al. |
| 9,062,248 | B2 | 6/2015 | Seong et al. |
| 2013/0169916 | A1* | 7/2013 | Mizusaki ............... C09K 19/14 349/123 |

(Continued)

FOREIGN PATENT DOCUMENTS

| JP | 2014-141648 A | 8/2014 |
| KR | 10-2013-0025808 A | 3/2013 |

(Continued)

*Primary Examiner* — Sophie Hon
(74) *Attorney, Agent, or Firm* — Cantor Colburn LLP

(57) ABSTRACT

A liquid crystal display, including: a first substrate, and a second substrate facing the first substrate; a liquid crystal layer disposed between the first substrate and the second substrates; a first liquid crystal alignment layer disposed between the liquid crystal layer and the first substrate; and a second liquid crystal alignment layer disposed between the liquid crystal layer and the second substrate, wherein: at least one of the first liquid crystal alignment layer and the second liquid crystal alignment layer includes reactive mesogens; and the liquid crystal layer includes an antioxidant.

10 Claims, 8 Drawing Sheets

(56) References Cited

U.S. PATENT DOCUMENTS

2014/0204329 A1\* 7/2014 Bae .................. G02F 1/133788
  349/182
2015/0138493 A1 5/2015 Bae et al.

FOREIGN PATENT DOCUMENTS

KR  10-2014-0014990 A  2/2014
KR  10-2014-0095326 A  8/2014

\* cited by examiner

LIQUID CRYSTAL DISPLAY AND METHOD OF MANUFACTURING THE SAME

This application claims priority to Korean Patent Application No. 10-2016-0012120 filed on Feb. 1, 2016, and all the benefits accruing therefrom under 35 U.S.C. § 119, the disclosure of which in its entirety is herein incorporated by reference.

BACKGROUND

1. Field

The present disclosure relates to a liquid crystal display (LCD) and a method of manufacturing the same.

2. Description of the Related Art

A liquid crystal display (LCD), which is one of the most widely-used flat panel displays, includes two substrates on which field-generating electrodes such as pixel electrodes and a common electrode are formed, and a liquid crystal layer which is interposed between the two substrates.

The LCD generates an electric field and determines the alignment direction of liquid crystal molecules in the liquid crystal layer by applying a voltage to the field-generating electrodes. The LCD displays an image by controlling the polarization of light incident thereupon. There still remains a need for new method of manufacturing LCD displays capable of improving a black afterimage.

SUMMARY

Exemplary embodiments of the present disclosure provide a liquid crystal display (LCD) capable of improving a black afterimage by suppressing an additional reaction of reactive mesogens present in an alignment layer and a method of manufacturing the LCD.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment, there is provided a liquid crystal display, including:
a first substrate; and a second substrate facing the first substrate;
a liquid crystal layer disposed between the first substrate and the second substrate;
a first liquid crystal alignment layer disposed between the liquid crystal layer and the first substrate; and
a second liquid crystal alignment layer disposed between the liquid crystal layer and the second substrate, wherein:
at least one of the first crystal alignment layer and the second liquid crystal alignment layer includes reactive mesogens; and
the liquid crystal layer includes an antioxidant.

In an exemplary embodiment, the reactive mesogens may be represented by Formula 1:

$$P1\text{-}SP1\text{-}A1\text{-}(A2)_m\text{-}SP2\text{-}P2 \quad \text{Formula 1}$$

wherein:
each of P1 and P2 may be selected from a (meth)acrylate group, a 4-methylene-5-oxotetrahydrofuran-2-yl group, a vinyl group, a vinyloxy group, and an epoxy group,
each of SP1 and SP2 may be selected from a single bond, a $C_{1\text{-}12}$ alkylene group, and a $C_{1\text{-}12}$ alkyleneoxy group,
each of A1 and A2 may be selected from a cyclohexyl group, a biphenyl group, a terphenyl group, a naphthalene group, a thiophene group, in each of which at least one hydrogen atom may be optionally substituted with halogen, —$OCH_3$, or a $C_{1\text{-}6}$ alkyl group, and
m may be an integer from 0 to 3.

In an exemplary embodiment, the reactive mesogens of the Formula 1 may be represented by Formulas 2 or 3:

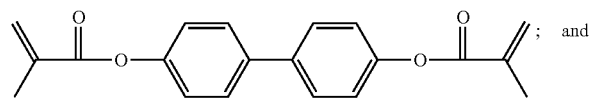

Formula 2

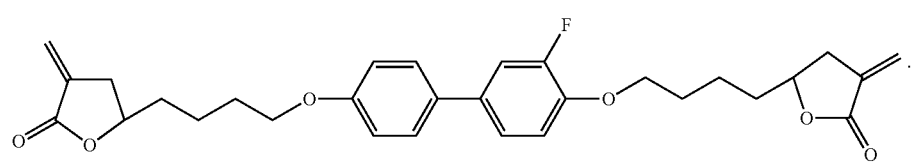

Formula 3

In an exemplary embodiment, the antioxidant may be represented by Formula 4:

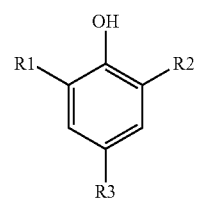

Formula 4 wherein:
each of R1 and R2 may be selected from a substituted or non-substituted $C_{1\text{-}6}$ alkyl group and hydrogen, and
R3 may be selected from a substituted or non-substituted $C_{1\text{-}6}$ alkyl group, a substituted or non-substituted $C_{1\text{-}7}$ alkyl carbonyl group, a substituted or non-substituted $C_{1\text{-}6}$ alkoxy group, and hydrogen.

In an exemplary embodiment, the antioxidant may be represented by Formula 5:

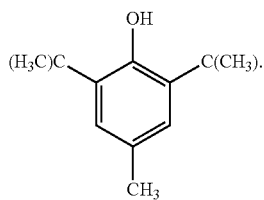

Formula 5

In an exemplary embodiment, the liquid crystal layer may include: liquid crystal molecule including an alkenyl group;

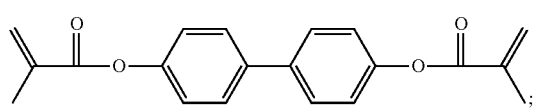

Formula 2 and

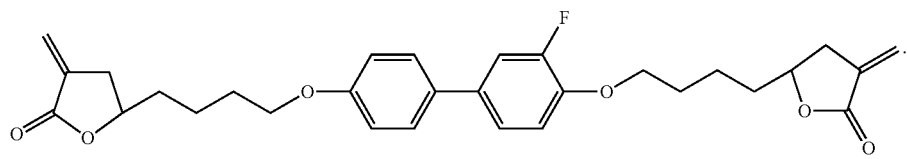

Formula 3 and the antioxidant in the liquid crystal layer may be in a range of 150 parts per million to 1,000 parts per million.

In an exemplary embodiment, the liquid crystal layer may not include liquid crystal molecules including an alkenyl group; and an amount of the antioxidant contained in the liquid crystal layer may be in a range of 50 parts per million to 150 parts per million.

According to an exemplary embodiment, there is provided a method of manufacturing an LCD, including:

preparing a first substrate and a second substrate, wherein the second substrate faces the is first substrate;

forming a first pre-liquid crystal alignment layer including reactive mesogens on a surface of the first substrate that faces the second substrate;

forming a second pre-liquid crystal alignment layer including reactive mesogens on a surface of the second substrate that faces the first substrate;

placing liquid crystal molecules including an antioxidant between the first substrate and the second substrate;

eluting the reactive mesogens to the liquid crystal layer through a thermal treatment; and forming a vertical alignment layer and a pretilt alignment stabilization layer including a polymer of the reactive mesogens on the surfaces of the first substrate and the second substrate, respectively, that face each other through an electric-field exposure process.

In an exemplary embodiment, the reactive mesogens may be represented by Formula 1:

P1-SP1-A1-(A2)$_m$-SP2-P2   Formula 1 wherein:

each of P1 and P2 may be selected from a (meth)acrylate group, a 4-methylene-5-oxotetrahydrofuran-2-yl group, a vinyl group, a vinyloxy group, and an epoxy group, each of SP1 and SP2 may be selected from a single bond, a $C_{1-12}$ alkylene group, and a $C_{1-12}$ alkyleneoxy group, each of A1 and A2 may be selected from a cyclohexyl group, a biphenyl group, a terphenyl group, a naphthalene group, a thiophene group, in each of which at least one hydrogen atom may be optionally substituted with halogen, —OCH$_3$, or a $C_{1-6}$ alkyl group, and m may be an integer from 0 to 3.

In an exemplary embodiment, the reactive mesogens of the Formula 1 may be represented by Formulas 2 or 3:

In an exemplary embodiment, the antioxidant may be represented by Formula 4:

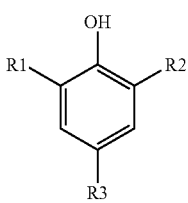

Formula 4 wherein:

each of R1 and R2 may be selected from a substituted or non-substituted $C_{1-6}$ alkyl group and hydrogen, and R3 may be selected from a substituted or non-substituted $C_{1-6}$ alkyl group, a substituted or non-substituted $C_{1-7}$ alkyl carbonyl group, a substituted or non-substituted $C_{1-6}$ alkoxy group, and hydrogen.

In an exemplary embodiment, the antioxidant may be represented by Formula 5:

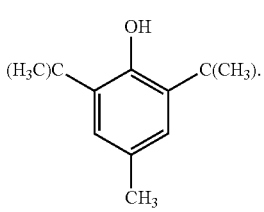

Formula 5

In an exemplary embodiment, the liquid crystal molecule may be liquid crystal molecules including an alkenyl group; and an amount of the antioxidant in the liquid crystal layer may be in a range of 150 parts per million to 1,000 part per million.

In an exemplary embodiment, the liquid crystal molecule may be liquid crystal molecules not including an alkenyl group; and an amount of the antioxidant in the liquid crystal layer may be in a range of 50 parts per million to 150 parts per million.

In an exemplary embodiment, the pretilt alignment stabilization layer may include:

a first pretilt alignment stabilization layer adjacent to the first substrate, and a second pretilt alignment stabilization layer adjacent to the second substrate;

the liquid crystal layer may include the first liquid crystal molecules aligned at a surface of the first pretilt alignment stabilization layer, and second liquid crystal molecules aligned at a surface of the second pretilt alignment stabilization layer; and in response to an electric field being released after the electric-field exposure process, the first liquid crystal molecules and the second liquid crystal molecules may be aligned at an inclination with respect to the first or second substrate, compared to when the electric-field exposure process is yet to be performed.

In an exemplary embodiment, the method may further include:

after the electric-field exposure process, applying fluorescent ultraviolet light in a state in which the electric field is released.

According to the exemplary embodiments, a black afterimage may be improved by suppressing an additional reaction of the reactive mesogens present in an alignment layer.

In addition, an LCD capable of improving a black afterimage improved by suppressing an additional reaction of the reactive mesogens present in an alignment layer may be provided.

Other features and aspects will be apparent from the following detailed description, the drawings, and the claims.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
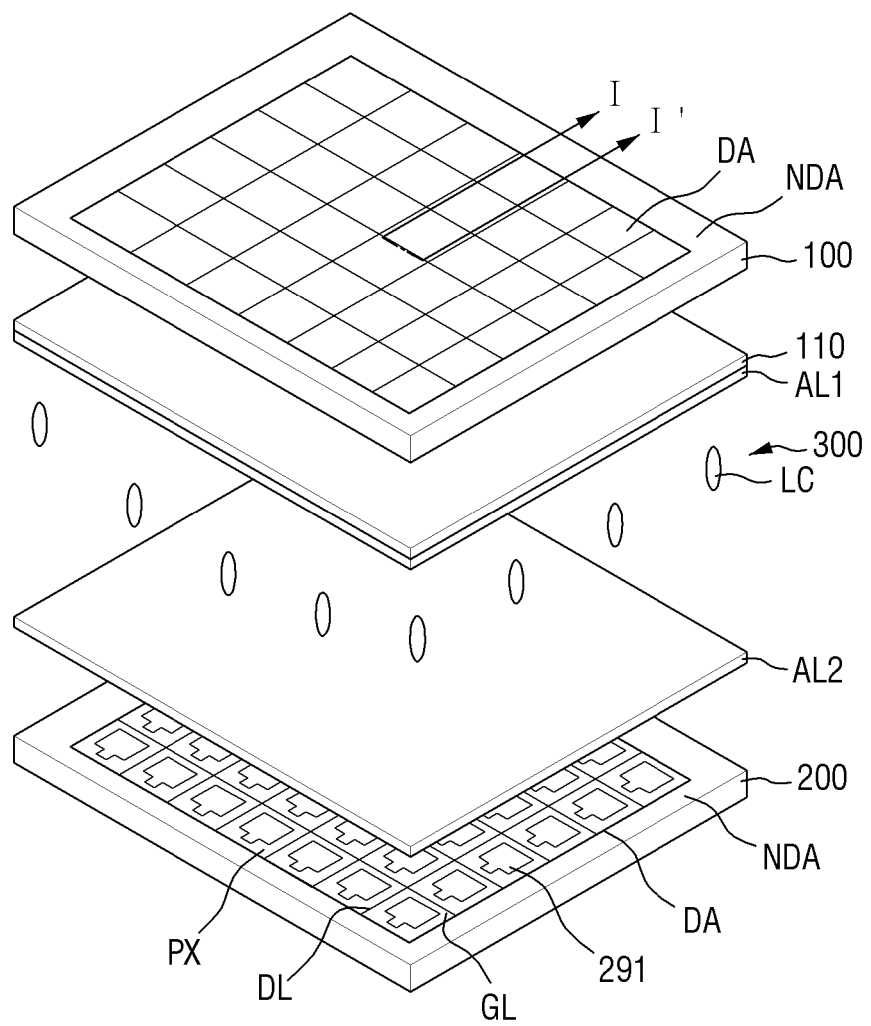
FIG. 1 is a schematic exploded perspective view of a liquid crystal display (LCD) according to an exemplary embodiment of the present disclosure.

Features of the present disclosure and methods of accomplishing the same may be understood more readily by reference to the following detailed description of preferred embodiments and the accompanying drawings.

The disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the inventive concept will only be defined by the appended claims.

In the drawings, the thickness of layers and regions are exaggerated for clarity. It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to," or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the disclosure.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

As used herein, the term "substituted" refers to a compound wherein at least one of hydrogen atoms thereof is substituted with a $C_{1-10}$ alkyl group, a $C_{2-10}$ alkynyl group, a $C_{6-20}$ aryl group, a $C_{7-20}$ alkylaryl group, a $C_{1-10}$ alkoxy group, a $C_{1-10}$ heteroalkyl group, a $C_{3-10}$ heteroalkylaryl group, a $C_{3-10}$ cycloalkyl group, a $C_{3-20}$ cycloalkenyl group, a $C_{6-20}$ cycloalkynyl group, a $C_{2-20}$ heterocycloalkyl group, a halogen (—F, —Cl, —Br or —I), a hydroxy group (—OH), a nitro group (—NO$_2$), a cyano group (—CN), an amino group (—NRR', wherein R and R' are each independently hydrogen or a $C_{1-6}$ alkyl group), an azido group (—N$_3$), an amidino group (—C(=NH)NH$_2$), a hydrazino group (—NHNH$_2$), a hydrazono group (=N(NH$_2$), an aldehyde group (—C(=O)H), a carbamoyl group (—C(O)NH$_2$), a thiol group (—SH), an ester group (—C(=O)OR, wherein R is a $C_{1-6}$ alkyl group or a $C_{6-12}$ aryl group), a carboxylic acid group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), and a combination thereof.

As used herein, the term "alkyl group" refers to a group derived from a straight or branched chain saturated aliphatic hydrocarbon having the specified number of carbon atoms and having a valence of at least one.

As used herein, the term "(meth)acrylate" refers to both "acrylate" [CH$_2$=CH—C(=O)—O—] and "methacrylate" [CH$_2$=C(CH$_3$)—C(=O)—O—].

As used herein, the term "alkyl carbonyl group" refers to a group "alkyl-C(=O)—", wherein the term "alkyl" is defined above.

As used herein, the term "alkoxy group" refers to a group "alkyl-O—", wherein the term "alkyl" is defined above.

As used herein, the term "alkenyl group" refers to a carbon-carbon double bond that can be monovalent (i.e., —CH=CH$_2$) or divalent (i.e., —CH=CH—).

As used herein, the term "alkylene group" refers to a straight or branched saturated aliphatic hydrocarbon group having a valence of at least two, optionally substituted with one or more substituents where indicated, provided that the valence of the alkylene group is not exceeded.

As used herein, the term "alkylene group" refers to a group "-alkylene-O—", wherein the term "alkylene" is defined above.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted $C_{1-6}$ alkyl" refers to a $C_{1-6}$ alkyl group substituted with a $C_{6-20}$ aryl group, the total number of carbon atoms in the resulting alkyl substituted arylene group is $C_{7-26}$.

Hereinafter, exemplary embodiments will be described with reference to the attached drawings.

Figure 2:
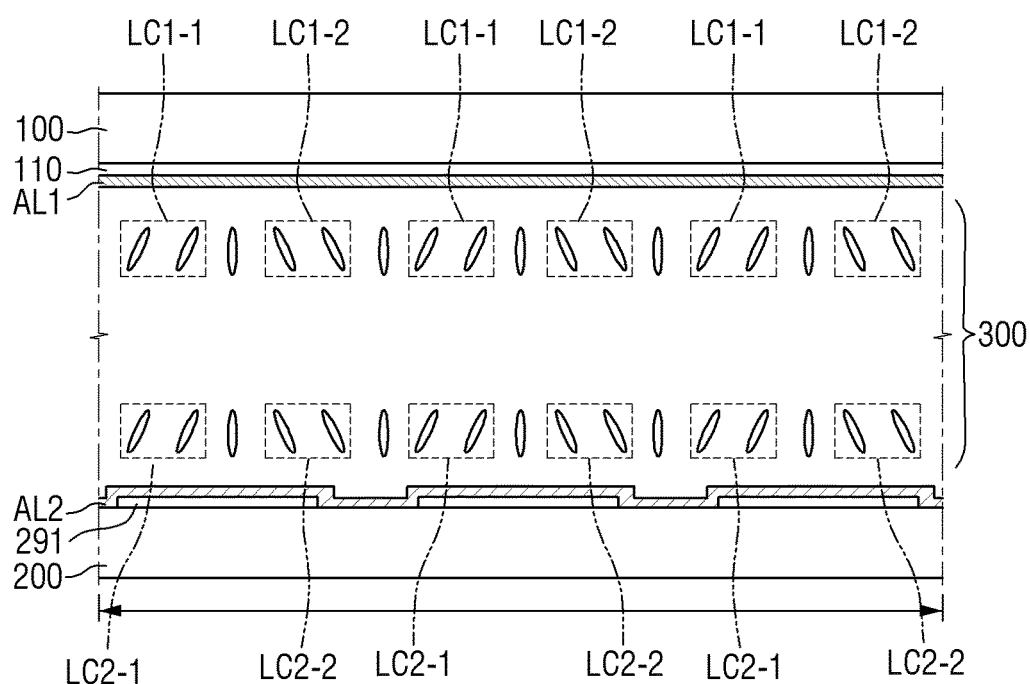
FIG. 2 is a schematic cross-sectional view taken along line I-I' of FIG. 1.

FIG. 1 is a schematic exploded perspective view of a liquid crystal display (LCD) according to an exemplary embodiment of the present disclosure, and FIG. 2 is a schematic cross-sectional view taken along line I-I' of FIG. 1.

Referring to FIGS. 1 and 2, an LCD 500 includes a first substrate 100 and a second substrate 200, which face each other, a liquid crystal layer 300, which is disposed between the first substrate 100 and the second substrate 200, a first liquid crystal alignment layer AL1 which is disposed between the liquid crystal layer 300 and the first substrate 100, and a second liquid crystal alignment layer AL2, which is disposed between the liquid crystal layer 300 and the second substrate 200. At least one of the first and second liquid crystal alignment layers AL1 and AL2 includes reactive mesogens, and the liquid crystal layer 300 includes an antioxidant.

Each of the first and second substrates 100 and 200 includes a display area DA and a non-display area NDA. The display area DA is an area in which an image is displayed, and the non-display area NDA is an area in which no image is displayed. The display area DA is surrounded by the non-display area NDA.

A common electrode 110 may be disposed between the first substrate 100 and the liquid crystal layer 300 and may be a patternless electrode having no slit patterns. Pixel electrodes 291 may be disposed between the second substrate 200 and the liquid crystal layer 300 and may be pattern electrodes having slit patterns.

The liquid crystal layer 300 may be disposed between the common electrode 110 and the zo pixel electrodes 291. The liquid crystal layer 300 may include the antioxidant and liquid crystal molecules LC having negative dielectric anisotropy. The first liquid crystal alignment layer AL1 may be disposed between the common electrode 110 and the liquid crystal layer 300. The second liquid crystal alignment layer AL2 may be disposed between the liquid crystal layer 300 and the pixel electrodes 291.

Since the liquid crystal layer 300 includes the antioxidant, an additional reaction of the reactive mesogens included in at least one of the first and second liquid crystal alignment layers AL1 and AL2 may be suppressed, and as a result, a black afterimage may be improved.

The second substrate 200 may be a thin-film transistor (TFT) substrate. A plurality of gate s lines GL, which extend in a first direction, and a plurality of data lines DL, which extend in a second direction that is perpendicular to the first direction, may be formed in the display area DA of the second substrate 200. A plurality of pixels PX, which are defined by the gate lines GL and the data lines DL, may be disposed in the pixel electrodes 291, respectively.

Although not illustrated, each of the pixel electrodes 291 may include sub-pixel electrodes, which are spaced from each other. For example, each of the sub-pixel electrodes may be rectangular as a whole. Each of the sub-pixel electrodes may be a pattern electrode having slit patterns. For example, the slit patterns include a stem, branches extending from the stem, and cutouts disposed among the branches. The stem may be formed in a cross (+) shape, and the branches may extend radially from the stem in a direction of about 45°.

The gate lines GL may include gate electrodes (not illustrated), which protrude from the gate lines GL toward the pixel electrodes 291 along the second direction. The data lines DL may include source electrodes (not illustrated) and drain electrodes (not illustrated). The source electrodes may protrude from the data lines DL and may be formed in a U shape. The drain electrodes may be disposed to be spaced from the source electrodes.

The pixel electrodes 291 may receive data voltages via TFTs, which are switching elements. The gate electrodes, which are the control terminals of the TFTs, may be electrically connected to the gate lines GL, the source electrodes, which are the input terminals of the TFTs, may be electrically connected to the data lines DL via contact holes (not illustrated), and the drain electrodes, which are the output terminals of the TFTs, may be electrically connected to the pixel electrodes 291.

The pixel electrodes 291 may form an electric field together with the common electrode 110 and may thus control the alignment direction of the liquid crystal molecules LC of the liquid crystal layer 300, which is disposed between the common electrode 110 and the pixel electrodes 291. The pixel electrodes 291 may control the alignment direction of first liquid crystal molecules LC1 and the alignment direction of second liquid crystal molecules LC2 by distorting the electric field.

The TFT substrate may have a structure in which a base substrate (not illustrated), which is formed of glass or a polymer, the gate electrodes, a gate insulating layer, semiconductor layers, an ohmic contact layer, the source electrodes, the drain electrodes, a passivation layer, and an organic layer are stacked.

The channels of the TFTs may be formed by the semiconductor layers. The semiconductor layers may be disposed to overlap the gate electrodes. The source electrodes and the drain electrodes may be spaced from each other with respect to the semiconductor layers.

A sustain electrode line (not illustrated) may include a stem line (not illustrated), which is disposed substantially in parallel to the gate lines GL, and a plurality of branch lines (not illustrated), which extend from the stem line. The sustain electrode line may not be provided, and the shape and the arrangement of the sustain electrode line may vary.

The non-display area NDA may be a light-shielding area, which is in the periphery of the display area DA and surrounds the display area DA. In the non-display area NDA of the second substrate 200, a driving unit (not illustrated), which provides gate driving signals and data driving zo signals to the pixels PX in the display area DA, may be provided. The gate lines GL and the data lines Dl may extend from the display area DA into the non-display area NDA and may be electrically connected to the driving unit.

The first substrate 100 may be a counter substrate of the second substrate 200. The common electrode 110 may be disposed on the second substrate 200.

A color filter layer (not illustrated) may be formed in an area of each of the pixels PX in the display area DA and may include red color filters (not illustrated), green color filters (not illustrated), and blue color filters (not illustrated). The color filter layer may be included in one of the first and second substrates 100 and 200. For example, in a case in which the first substrate 100 includes the color filter layer, the first substrate 100 may have a structure in which a base substrate (not illustrated) formed of glass or a polymer, the color filter layer, and an overcoat layer are stacked. The overcoat layer may be a planarization layer covering the color filter layer, in which case, the common electrode 110 may be disposed on the overcoat layer.

For example, in a case in which the second substrate 200 includes the color filter layer, the second substrate 200 may have a color filter-on-array (COA) structure in which the color filters are formed on a transparent insulating substrate on which the TFTs are formed. For example, the color filter layer may be disposed between the passivation layer, which covers the source electrodes and the drain electrodes, and the organic layer.

A light-shielding pattern layer (not illustrated) may be disposed along the boundaries among the red color filters, the green color filters, and the blue color filters. The light-shielding pattern layer may be included in one of the first and second substrates 100 and 200. For example, the light-shielding pattern layer may be a black matrix.

FIG. 2 illustrates the alignment of liquid crystal molecules (LC1-1, LC1-2, LC2-1, and LC2-2) in an initial state in which an electric field is yet to be applied to the LCD 500.

Referring to FIG. 2, first liquid crystal molecules (LC1-1 and LC1-2) may be aligned at (i.e., adjacent to) the first surface of the first liquid crystal alignment layer ALL and second liquid crystal molecules (LC2-1 and LC2-2) may be aligned at (i.e., adjacent to) the surface of the second liquid crystal alignment layer AL2. The first liquid crystal molecules (LC1-1 and LC1-2) may be aligned at the surface of the first liquid crystal alignment layer AL1 to form a predetermined pretilt angle with respect to the surface of the first liquid crystal alignment layer AL1, and the second liquid crystal molecules (LC2-1 and LC2-2) may be aligned at the surface of the second liquid crystal alignment layer AL2 to form a predetermined pretilt angle with respect to the surface of the second liquid crystal alignment layer AL2.

For example, in the initial state in which an electric field is yet to be applied to the LCD 500, two or more domains having different liquid crystal molecule alignment directions, like those formed by "1-1" liquid crystal molecules LC1-1 and "1-2" liquid crystal molecules LC1-2, may be formed at the surface of the first liquid crystal alignment layer ALL and similarly, two or more domains having different liquid crystal molecule alignment directions, like those of "2-1" liquid crystal molecules LC2-1 and "2-2" liquid crystal molecules LC2-2, may be formed at the surface of the second liquid crystal alignment layer AL2.

Directions of the domains formed at the surface of the first liquid crystal alignment layer AL1 by the first liquid crystal molecules (LC1-1 and LC1-2) may correspond to directions of the domains formed at the surface of the second liquid crystal alignment layer AL2 by the second liquid crystal molecules (LC2-1 and LC2-2). That is, the pretilt directions of the first liquid crystal molecules (LC1-1 and LC1-2) at the surface of the first liquid crystal alignment layer AL1 may be identical to the pretilt directions of the second liquid crystal molecules (LC2-1 and LC2-2) at the surface of the second liquid crystal alignment layer AL2.

For example, in the first liquid crystal alignment layer ALL the "1-1" liquid crystal molecules LC1-1 may be aligned in a first tilt direction, and the "1-2" liquid crystal molecules LC1-2 may be aligned in a second tilt direction. In the second liquid crystal alignment layer AL2, which is disposed at a location vertically corresponding to the first liquid crystal alignment layer ALL the "2-1" liquid crystal molecules LC2-1 may be aligned in the first tilt direction, and the "2-2" liquid crystal molecules LC2-2 may be aligned in the second tilt direction. The first tilt direction may be a direction of about $-\alpha°$ with respect to an imaginary perpendicular straight line to the first liquid crystal alignment layer AL1 or the second liquid crystal alignment layer AL2, or the second tilt direction may be a direction of about $+\alpha°$ with respect to the imaginary perpendicular straight line to the first liquid crystal alignment layer AL1 or the second liquid crystal alignment layer AL2, where a is a positive real number.

At least one of the first and second liquid crystal alignment layers AL1 and AL2 may include reactive mesogens, and the reactive mesogens may be represented by Formula 1:

$$P1\text{-}SP1\text{-}A1\text{-}(A2)_m\text{-}SP2\text{-}P2 \qquad \text{Formula 1}$$

wherein:
each of P1 and P2 is a polymerizable terminal group such as, for example, a (meth)acrylate group, a 4-methylene-5-oxotetrahydrofuran-2-yl group, a vinyl group, a vinyloxy group, or an epoxy group, SP1 is a spacer group connecting P1 and A1, such as, for example, a single bond, a $C_{1\text{-}12}$ alkylene group, or a $C_{1\text{-}12}$ alkyleneoxy group, SP2 is a spacer group connecting P2 and A2, such as, for example, a single bond, a $C_{1\text{-}12}$ alkylene group, or a $C_{1\text{-}12}$ alkyleneoxy group, each of A1 and A2 is a mesogen structure such as, for example, a cyclohexyl group, a biphenyl group, a terphenyl group, a naphthalene group, or a thiophene group, in each of which at least one hydrogen atom may be optionally substituted with halogen, $-OCH_3$, or a $C_{1\text{-}6}$ alkyl group, and m is a natural number from 1 to 3.

The 4-methylene-5-oxotetrahydrofuran-2-yl group refers to group

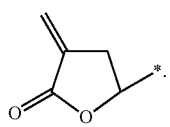

For example, the reactive mesogens may be, but are not limited to, at least one compound represented by Formula 2 and Formula 3:

The antioxidant may be represented by Formula 4:

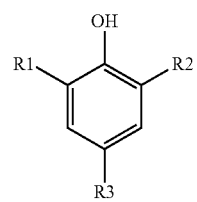

Formula 4 wherein:
each of R1 and R2 may be selected from a substituted or non-substituted $C_{1\text{-}6}$ alkyl group and hydrogen, and R3 may be selected from a substituted or non-substituted $C_{1\text{-}6}$ alkyl group, a substituted or non-substituted $C_{1\text{-}7}$ alkyl carbonyl group, a substituted or non-substituted $C_{1\text{-}6}$ alkoxy group, and hydrogen.

For example, the antioxidant may be a compound represented by Formula 5:

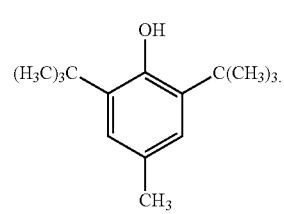

Formula 5

The antioxidant may prevent the reactive mesogens, which are involved in the formation of the first liquid crystal alignment layer AL1 and/or the second liquid crystal alignment layer AL2, from additionally reacting once the first liquid crystal alignment layer AL1 and/or the second liquid crystal alignment layer AL2 are formed. For example, the antioxidant may suppress an additional reaction of the reactive mesogens by capturing any remaining radicals of the reactive mesogens, and may thus improve a black image.

The ingredients of the liquid crystal layer 300 are not particularly limited, but if the liquid crystal layer 300 includes liquid crystal molecules not including an alkenyl group, the antioxidant may be contained in the liquid crystal layer 300 in the range of 50 parts per million (ppm) to 150 ppm. If the content of the antioxidant is less than 50 ppm, an additional reaction of the reactive mesogens may be insufficiently suppressed. On the other hand, if the content of the antioxidant exceeds 150 ppm, the polymerization of the reactive mesogens may be excessively suppressed during the Formula 2

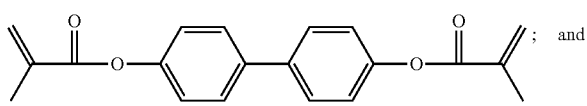 ; and

Formula 3

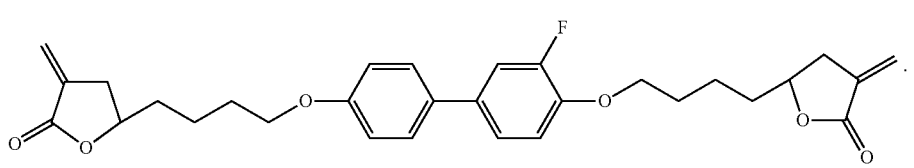

formation of the first liquid crystal alignment layer AL1 and the second liquid crystal alignment layer AL2 such that there may be some areas in which the first liquid crystal alignment layer AL1 and the second liquid crystal alignment layer AL2 are not formed.

On the other hand, if the liquid crystal layer 300 includes liquid crystal molecules including an alkenyl group, the antioxidant may be contained in the liquid crystal layer 300 in the range of 150 ppm to 1,000 ppm. The liquid crystal molecules including the alkenyl group may be self-oxidized and extinguished (i.e., reacted) during the irradiation of ultraviolet (UV) light in the process of manufacturing the LCD 500. Accordingly, a larger amount of the antioxidant is needed in a case in which liquid crystal molecules including an alkenyl group are used, than in a case in which liquid crystal molecules not including an alkenyl group are used.

The present disclosure provides a method of manufacturing the LCD 500, and FIGS. 3 through 8 are schematic cross-sectional views illustrating a method of manufacturing an LCD, according to an exemplary embodiment of the present disclosure.

A method of manufacturing the LCD 500 will hereinafter be described with reference to FIGS. 3 through 8.

Figure 3:
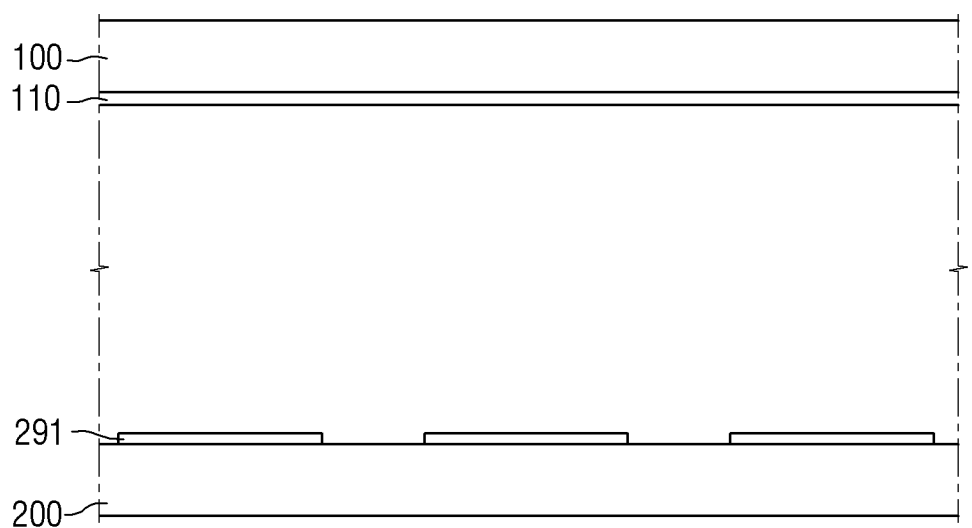
FIGS. 3 through 8 are schematic cross-sectional views illustrating a method of manufacturing an LCD, according to an exemplary embodiment of the present disclosure.

Referring to FIG. 3, the first substrate 100 is disposed to face the second substrate 200 while maintaining a predetermined cell gap with the second substrate 200. For example, the second substrate 200 may be a TFT substrate, and the first substrate 100, which is a counter substrate of the second substrate 200, may be a color filter substrate.

The common electrode 110 may be disposed on the bottom surface of the first substrate 100, i.e., a surface of the first substrate 100 that faces the second substrate 200, and may be formed of indium tin oxide (ITO), indium zinc oxide (IZO), indium oxide, zinc oxide, tin oxide, gallium oxide, titanium oxide, aluminum (Al), silver (Ag), platinum (Pt), chromium (Cr), molybdenum (Mo), tantalum (Ta), niobium (Nb), zinc (Zn), magnesium (Mg), or an alloy or a lamination layer thereof. The common electrode 110 may be a patternless electrode having no slit patterns.

The pixel electrodes 291 may be disposed on the second substrate 200 and may be formed of ITO, IZO, indium oxide, zinc oxide, tin oxide, gallium oxide, titanium oxide, Al, Ag, Pt, Cr, Mo, Ta, Nb, Zn, Mg, or an alloy or a lamination layer thereof. As already mentioned above, the pixel electrodes 291 may be patterned electrodes having slit patterns, and the second substrate 200 may be partially exposed through the slit patterns of the pixel electrodes 291.

Figure 4:
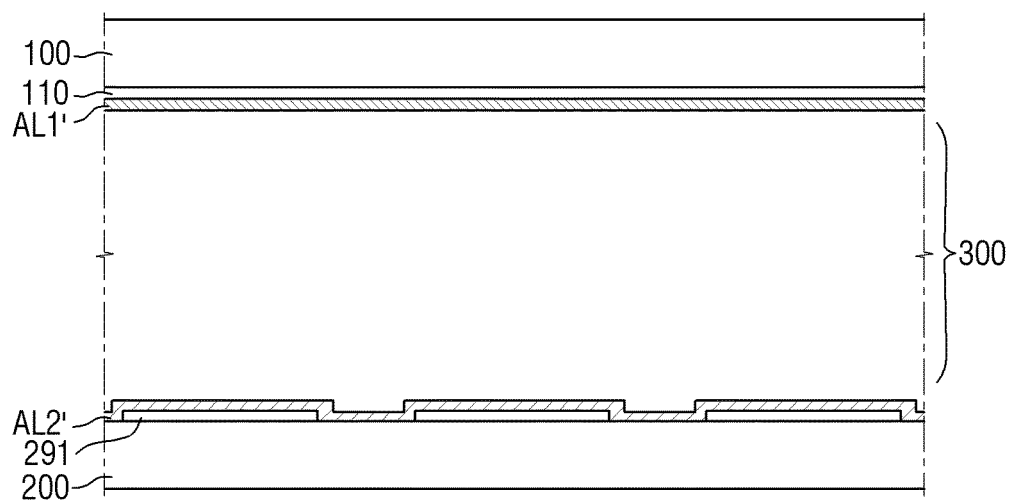

Referring to FIG. 4, the method of manufacturing the LCD 500 includes forming a first pre-liquid crystal alignment layer AL1' including reactive mesogens on the surface of the first substrate 100 that faces the second substrate 200 and forming a second pre-liquid crystal alignment layer AL2' including reactive mesogens on a surface of the second substrate 200 that faces the first is substrate 100. Each of the steps of forming the first pre-liquid crystal alignment layer AL1' and the second pre-liquid crystal alignment layer AL2' may be performed by applying a liquid crystal alignment agent including the reactive mesogens and performing a thermal treatment.

The reactive mesogens may be represented by Formula 1:

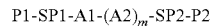

P1-SP1-A1-(A2)$_m$-SP2-P2    Formula 1 wherein:

each of P1 and P2 is a polymerizable terminal group such as, for example, a (meth)acrylate group, a 4-methylene-5-oxotetrahydrofuran-2-yl group, a vinyl group, a vinyloxy group, or an epoxy group, SP1 is a spacer group connecting P1 and A1, such as, for example, a single bond, a $C_{1-12}$ alkylene group, or a $C_{1-12}$ alkyleneoxy group, SP2 is a spacer group connecting P2 and A2, such as, for example, a single bond, a $C_{1-12}$ alkylene group, or a $C_{1-12}$ alkyleneoxy group, each of A1 and A2 is a mesogen structure such as, for example, a cyclohexyl group, a biphenyl group, a terphenyl group, a naphthalene group, or a thiophene group, in each of which at least one hydrogen atom may be optionally substituted with halogen, —OCH$_3$, or a $C_{1-6}$ alkyl group, and m is a natural number from 1 to 3.

The reactive mesogens may be, but are not limited to, at least one compound represented by Formulas 2 and 3:

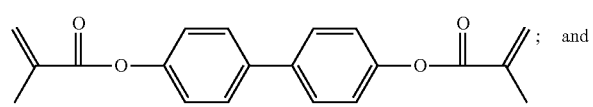

Formula 2

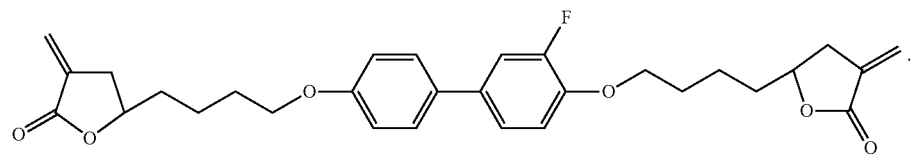

Formula 3

Each of the first and second pre-liquid crystal alignment layers AL1' and AL2' may further include a polymerization initiator for initiating the polymerization reaction of the reactive mesogens. Suitable polymerization initiators include those known in the art.

Figure 5:
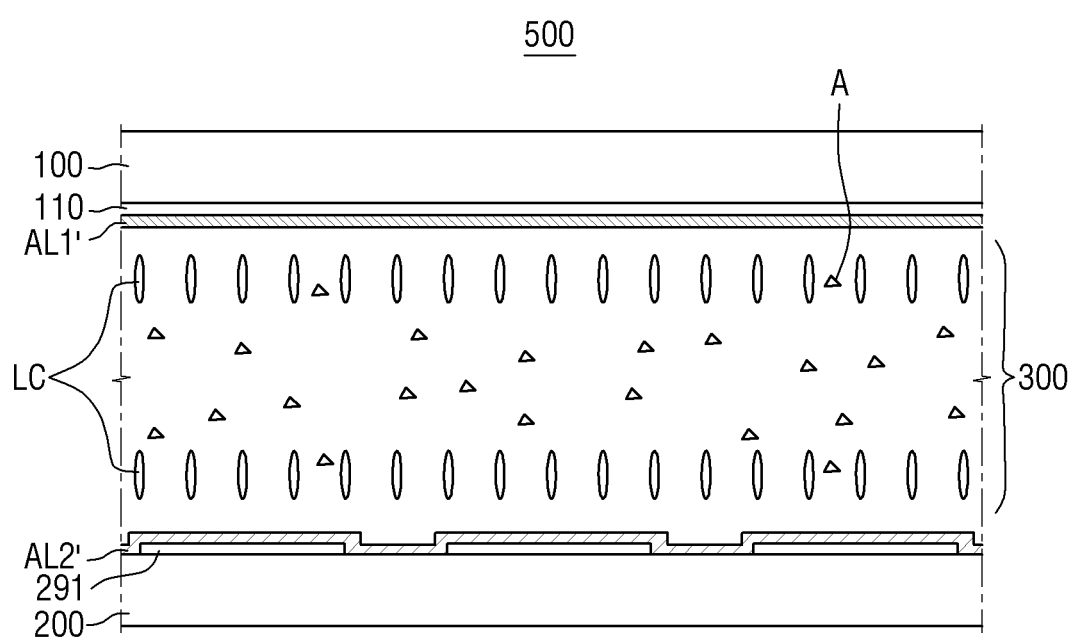

Referring to FIG. 5, the method of manufacturing the LCD 500 also includes forming the liquid crystal layer 300 by placing (for example, by injecting) liquid crystal molecules LC including an antioxidant A between the first and second substrates 100 and 200. The step of forming the liquid crystal layer 300 may be performed by injecting or otherwise depositing a composition for forming the liquid crystal layer 300.

The liquid crystal molecules LC may be liquid crystal molecules including an alkenyl group, in which case, the antioxidant A may be contained in the liquid crystal molecules LC in the range of 150 ppm to 1,000 ppm. Alternatively, the liquid crystal molecules LC may be liquid crystal molecules not including an alkenyl group, in which case, the antioxidant A may be contained in the liquid crystal molecules LC in the range of 50 ppm to 150 ppm. The content of the antioxidant A has already been described above, and thus, a detailed description thereof will be omitted.

The antioxidant A may be represented by Formula 4:

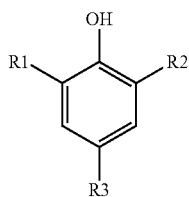

Formula 4 wherein:
each of R1 and R2 may be selected from a substituted or non-substituted $C_{1-6}$ alkyl group and hydrogen, and
R3 may be selected from a substituted or non-substituted $C_{1-6}$ alkyl group, a substituted or non-substituted $C_{1-7}$ alkyl carbonyl group, a substituted or non-substituted $C_{1-6}$ alkoxy group, and hydrogen.

For example, the antioxidant A may be a compound represented by Formula 5:

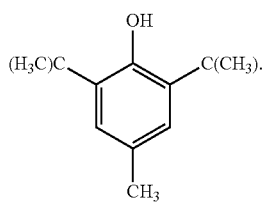

Formula 5

The antioxidant A may prevent the reactive mesogens, which are involved in the formation of the first liquid crystal alignment layer AL1 and/or the second liquid crystal alignment layer AL2, from additionally reacting once the first liquid crystal alignment layer AL1 and/or the second liquid crystal alignment layer AL2 are formed. For example, the antioxidant A may suppress an additional reaction of the reactive mesogens by capturing any remaining radicals of the reactive mesogens, and may thus improve a black image.

Figure 6:
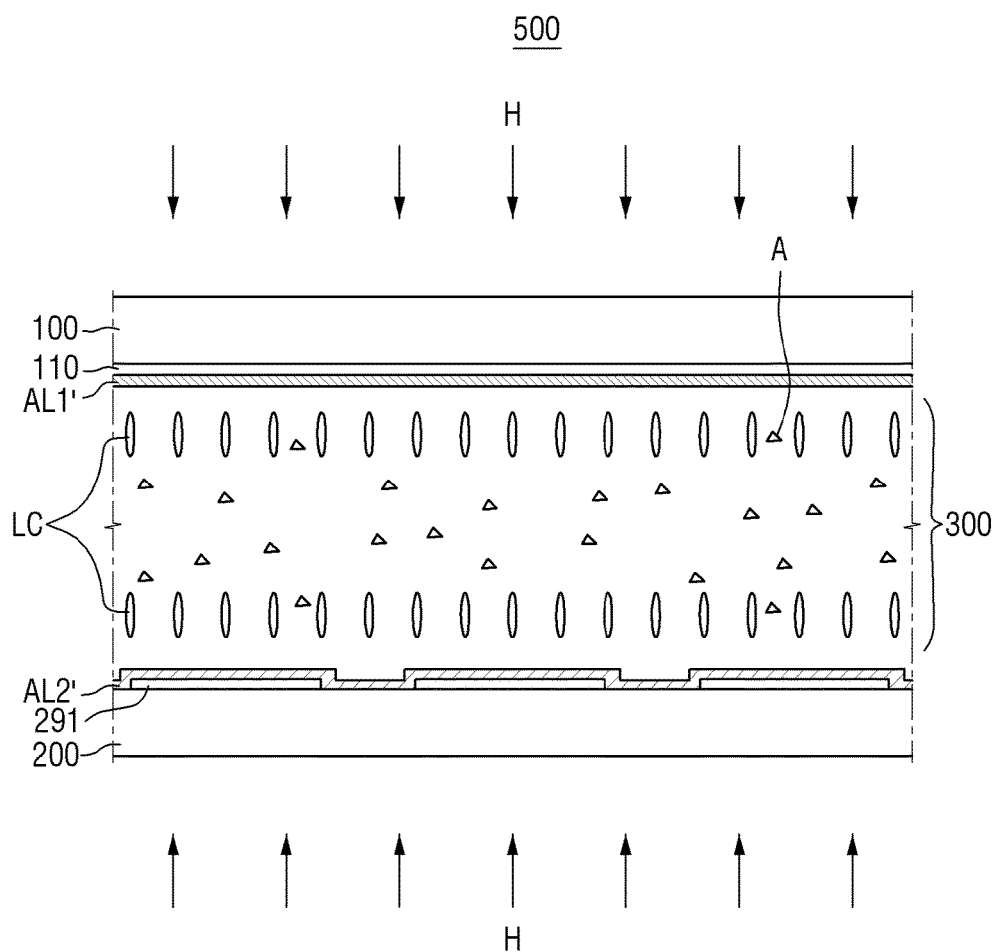

Referring to FIG. 6, the method of manufacturing the LCD 500 also includes eluting the reactive mesogens to the liquid crystal layer 300 through thermal treatment H. As used herein, the terms "elute" and "eluting" mean to cause or causing the reactive mesogens to transfer into the liquid crystal layer 300 through thermal treatment H. The reactive mesogens included in the first and second pre-liquid crystal alignment layers AL1' and AL2' may be eluted into the liquid crystal layer 300 by performing thermal treatment on the first substrate 100 and/or the second substrate 200.

Figure 7:
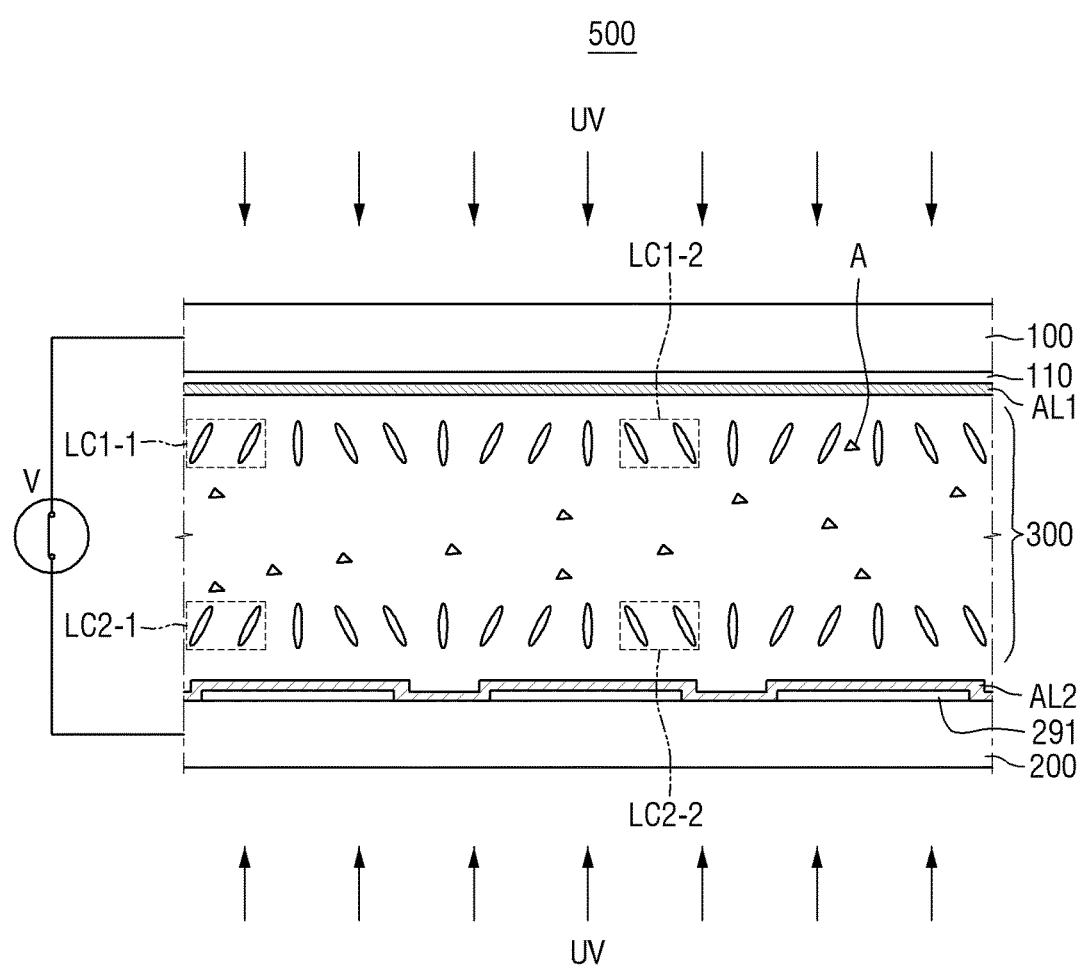

Referring to FIG. 7, an electric-field exposure process is performed on a liquid crystal panel after the elution of the reactive mesogens to the liquid crystal layer 300. During the electric-field exposure process, the liquid crystal molecules LC in the liquid crystal layer 300 may be aligned at a predetermined pretilt angle with respect to the first and second substrates 100 and 200. The pretilt angle of the liquid crystal molecules LC aligned at the surface of the first substrate 100 may be substantially the same as the pretilt angle of the liquid crystal molecules LC aligned at the surface of the second substrate 200.

For example, in response to an electric field being applied to the LCD 500, the liquid crystal molecules (LC1-1, LC1-2, LC2-1, and LC2-2) may be aligned in a tilt direction perpendicular to an electric field formed between the common electrode 110 and the pixel electrodes 291. That is, the "1-1" liquid crystal molecules LC1-1 and the "2-1" liquid crystal molecules LC2-1 may be aligned in the first tilt direction, and the "1-2" liquid crystal molecules LC1-2 and the "2-2" liquid crystal molecules LC2-2 may be aligned in the second tilt direction. As a part of an electric-field exposure process being performed, the polymerization reaction of the reactive mesogens included in the first and second liquid crystal alignment layers AL1 and AL2 may be initiated by applying UV light to the LCD 500 in the presence of the electrical field. As a result, the "1-1" liquid crystal molecules LC1-1 and the "2-1" liquid crystal molecules LC2-1 may be aligned in the first tilt direction, and the "1-2" liquid crystal molecules LC1-2 and the "2-2" liquid crystal molecules LC2-2 may be aligned in the second tilt direction. As the electric-field exposure process is continued, the content of the reactive mesogens eluted to the liquid crystal layer 300 may further decrease.

Figure 8:
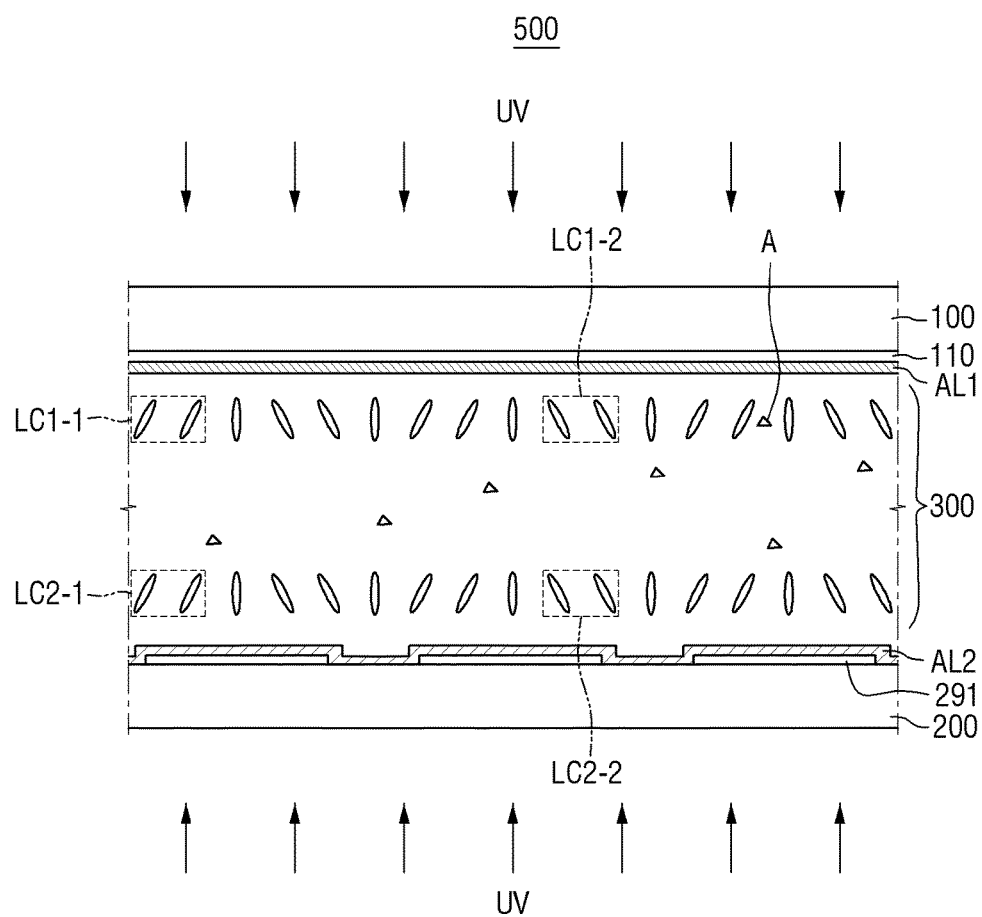

FIG. 8 illustrates an LCD 500 obtained by the electric-field exposure process. Referring to FIG. 8, the first and second liquid crystal alignment layers AL1 and AL2 may immobilize or stabilize the alignment direction of the first liquid crystal molecules (LC1-1 and LC1-2) and the alignment direction of the second liquid crystal molecules (LC2-1 and LC2-2). Accordingly, the first liquid crystal molecules (LC1-1 and LC1-2) and the second liquid crystal molecules (LC2-1 and LC2-2) may remain aligned at an inclination with respect to the first substrate 100 or the second substrate 200 at the surface of the first liquid crystal alignment layer AL1 or at the surface of the second liquid crystal alignment layer AL2 even when the electric field applied to the LCD 500 is released.

As a result of the electric-field exposure process, the first liquid crystal alignment layer AL1 may be formed as a vertical alignment layer, and the second liquid crystal alignment layer AL2 may be formed as a pretilt alignment stabilization layer including the polymers of the reactive mesogens. In another embodiment as a result of the electric-field exposure process, the first liquid crystal alignment layer AL1 and the second liquid crystal alignment layer AL2 may each provide a vertical alignment layer and a pretilt alignment stabilization layer including the polymers of the reactive mesogens. For example, the first liquid crystal alignment layer AL1 may include a first vertical alignment layer and a first pretilt alignment stabilization layer. Also, the second liquid crystal alignment layer AL2 may include a second vertical alignment layer and a second pretilt alignment stabilization layer. The vertical alignment layer may be formed adjacent or in contact with the common electrode 110 or the pixel electrodes 291, and the pretilt alignment stabilization layer may be formed adjacent or in contact with the liquid crystal layer 300. For example, the first vertical alignment layer may be disposed on the pixel electrode 291, and the first pretilt alignment stabilization layer may be disposed on the first vertical alignment layer. Similarly, the second vertical alignment layer may be disposed on the common electrode 110, and the second pretilt alignment stabilization layer may be disposed on the second vertical alignment layer.

In other words, the pretilt alignment stabilization layer may include a first pretilt alignment stabilization layer, which is adjacent to the first substrate 100, and a second pretilt alignment stabilization layer, which is adjacent to the second substrate 200, and the liquid crystal layer 300 includes the first liquid crystal molecules (LC1-1 and LC1-2), which are aligned at the surface of the first pretilt alignment stabilization layer, and the second liquid crystal molecules (LC2-1 and LC2-2), which are aligned at the surface of the second pretilt alignment stabilization layer. In response to the electric field applied to the LCD 500 being released after the electric-field exposure process, the first liquid crystal molecules (LC1-1 and LC1-2) and the second liquid crystal molecules (LC2-1 and LC2-2) may be aligned at an inclination with respect to the first substrate 100 or the second substrate 200, compared to when the electric-field exposure process is yet to be performed.

Referring again to FIG. 8, any remaining reactive mesogens may be reacted, and thus essentially removed by applying fluorescent ultraviolet (UV) light to the LCD 500 in a state in which the electric field is no longer applied to the LCD 500. That is, any reactive monomers that remain unreacted in the liquid crystal layer 300 after the irradiation of UV light for the electric-field exposure process may be removed by the reaction.

While exemplary embodiments have been shown and described above, it will be apparent to those skilled in the art that modifications and variations could be made without departing from the spirit and scope of the disclosure as defined by the appended claims. The exemplary embodiments should be considered in a descriptive sense only and not for purposes of limitation.

What is claimed is:

1. A liquid crystal display, comprising:
a first substrate; and a second substrate facing the first substrate;
a liquid crystal layer disposed between the first substrate and the second substrate;
a first liquid crystal alignment layer disposed between the liquid crystal layer and the first substrate; and
a second liquid crystal alignment layer disposed between the liquid crystal layer and the second substrate,
wherein:
at least one of the first liquid crystal alignment layer and the second liquid crystal alignment layer comprises reactive mesogens; and
the liquid crystal layer comprises an antioxidant
wherein the reactive mesogens are represented by Formula 1:

P1-SP1-A1-(A2)$_m$-SP2-P2     Formula 1 wherein:
each of P1 and P2 is selected from a (meth)acrylate group, a 4-methylene-5-oxotetrahydrofuran-2-yl group, a vinyl group, a vinyloxy group, and an epoxy group,
each of SP1 and SP2 is selected from a single bond, a $C_{1-12}$ alkylene group, and a $C_{1-12}$ alkyleneoxy group,
each of A1 and A2 is selected from a terphenyl group, a naphthalene group, and a thiophene group, in each of which at least one hydrogen atom is optionally substituted with halogen, —OCH$_3$, or a $C_{1-6}$ alkyl group, and
m is an integer selected from 2 and 3; and
wherein
the antioxidant is represented by Formula 4:

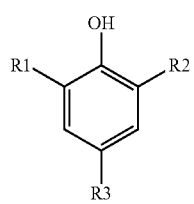

Formula 4 wherein:
each of R1 and R2 is selected from a substituted or non-substituted $C_{1-6}$ alkyl group and hydrogen, and
R3 is selected from a substituted or non-substituted $C_{1-6}$ alkyl group, a substituted or non-substituted $C_{1-7}$ alkyl carbonyl group, a substituted or non-substituted $C_{1-6}$ alkoxy group, and hydrogen.

2. The liquid crystal display of claim 1, wherein the antioxidant is represented by Formula 5:

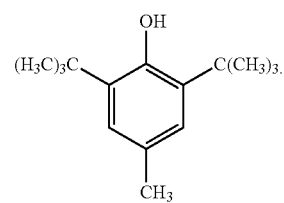

Formula 5

3. The liquid crystal display of claim 1, wherein:
the liquid crystal layer comprises liquid crystal molecules comprising an alkenyl group; and
an amount of the antioxidant in the liquid crystal layer is in a range of 150 parts per million to 1,000 parts per million.

4. The liquid crystal display of claim 1, wherein:
the liquid crystal layer does not comprise liquid crystal molecules comprising an alkenyl group; and
an amount of the antioxidant in the liquid crystal layer is in a range of 50 parts per million to 150 parts per million.

5. A method of manufacturing a liquid crystal display, comprising:
preparing a first substrate and a second substrate, wherein the second substrate faces the first substrate;
forming a first pre-liquid crystal alignment layer comprising reactive mesogens on a surface of the first substrate that faces the second substrate;
forming a second pre-liquid crystal alignment layer comprising reactive mesogens on a surface of the second substrate that faces the first substrate;
placing liquid crystal molecules comprising an antioxidant between the first substrate and the second substrate;
eluting the reactive mesogens to the liquid crystal layer through a thermal treatment; and
forming a vertical alignment layer and a pretilt alignment stabilization layer comprising a polymer of the reactive mesogens on the surfaces of the first substrate and the second substrate, respectively, that face each other through an electric-field exposure process,
wherein the reactive mesogens are represented by Formula 1:

P1-SP1-A1-(A2)$_m$-SP2-P2     Formula 1 wherein:
each of P1 and P2 is selected from a (meth)acrylate group, a 4-methylene-5-oxotetrahydrofuran-2-yl group, a vinyl group, a vinyloxy group, and an epoxy group,
each of SP1 and SP2 is selected from a single bond, a $C_{1-12}$ alkylene group, and a $C_{1-2}$ alkyleneoxy group,
each of A1 and A2 is selected from a terphenyl group, a naphthalene group, and a thiophene group, in each of which at least one hydrogen atom is optionally substituted with halogen, —OCH$_3$, or a $C_{1-6}$ alkyl group, and
m is an integer selected from 2 and 3; and wherein:
the antioxidant is represented by Formula 4:

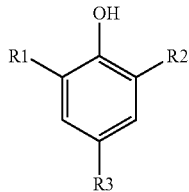

Formula 4 wherein:
each of R1 and R2 is selected from a substituted or non-substituted $C_{1-6}$ alkyl group and hydrogen, and
R3 is selected from a substituted or non-substituted $C_{1-6}$ alkyl group, a substituted or non-substituted $C_{1-7}$ alkyl carbonyl group, a substituted or non-substituted $C_{1-6}$ alkoxy group, and hydrogen.

6. The method of claim 5, wherein the antioxidant is represented by Formula 5:

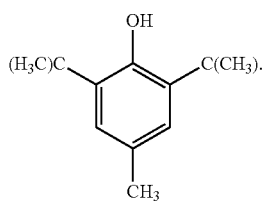

Formula 5

7. The method of claim 5, wherein:
the liquid crystal molecules comprise an alkenyl group; and
an amount of the antioxidant in the liquid crystal layer is in a range of 150 parts per million to 1,000 parts per million.

8. The method of claim 5, wherein:
the liquid crystal molecules do not comprise an alkenyl group; and
an amount of the antioxidant in the liquid crystal layer is in the range of 50 parts per million to 150 parts per million.

9. The method of claim 5, wherein:
the pretilt alignment stabilization layer comprises a first pretilt alignment stabilization layer adjacent to the first substrate, and a second pretilt alignment stabilization layer adjacent to the second substrate;
the liquid crystal layer comprises first liquid crystal molecules aligned at a surface of the first pretilt alignment stabilization layer, and second liquid crystal molecules aligned at a surface of the second pretilt alignment stabilization layer; and
in response to an electric field being released after the electric-field exposure process, the first liquid crystal molecules and the second liquid crystal molecules are aligned at an inclination with respect to the first or second substrate, compared to when the electric-field exposure process is yet to be performed.

10. The method of claim 5, further comprising:
after the electric-field exposure process, applying fluorescent ultraviolet light in a state in which the electric field is released.

* * * * *